Oct. 27, 1964 N. W. CLARK ETAL 3,154,330
COUPLING FOR SHEET METAL CONDUITS
Filed Sept. 22, 1961 2 Sheets-Sheet 1

INVENTORS
NOAH W. CLARK
WILLIAM T. COOPER
CARL P. WILLIAMS
BY Oldham & Oldham
ATTYS.

Oct. 27, 1964  N. W. CLARK ETAL  3,154,330
COUPLING FOR SHEET METAL CONDUITS
Filed Sept. 22, 1961  2 Sheets-Sheet 2

INVENTORS
NOAH W. CLARK
WILLIAM T. COOPER
CARL P. WILLIAMS
BY Oldham & Oldham
ATTYS.

United States Patent Office 3,154,330
Patented Oct. 27, 1964

3,154,330
COUPLING FOR SHEET METAL CONDUITS
Noah W. Clark, Akron, Ohio, William T. Cooper, 250 Hampshire Road, Akron 13, Ohio, and Carl P. Williams, Akron, Ohio; said Clark and said Williams assignors to said Cooper
Filed Sept. 22, 1961, Ser. No. 140,071
3 Claims. (Cl. 285—419)

This invention relates to sheet metal conduit couplings, and, more particularly, is concerned with quickly applied sheet metal couplings for securing sheet metal conduits together.

Various types of couplings made of sheet metal have been proposed and provided heretofore for securing sheet metal conduits together. However, known couplings have been cumbersome and laborious to apply, are often initially expensive, sometimes require two operators, one to hold the conduits, and one to apply the coupling, or they may not be sufficiently fluid tight when applied or after a period of service.

It is the general object of the present invention to avoid and overcome the foregoing and other difficulties of and objections to prior art practices by the provision of a relatively simple, initially inexpensive, sheet metal coupling for securing sheet metal conduits together, the coupling being very quickly applied by a single operator to provide a particularly tight joint initially and over long periods of service.

The foregoing objects of the invention, and other objects which will become apparent as the description proceeds, are achieved by the provision of a coupling including a sheet metal collar split longitudinally to provide spaced longitudinal edges, a sheet metal shelf bridging the split between the edges of the collar, means fixing the corners only of the shelf to one longitudinal edge of the collar and with the other side of the shelf sliding beneath the other longitudinal edge of the collar, sheet metal tongue secured to said other longitudinal edge of the collar and stabbing between the center portion of the shelf and the said one longitudinal edge of the collar, means pressed out from the tongue to form a plurality of rows of flanges any row of which is adapted to lock with the edge of the shelf, the edge of the shelf interlocking with the pressed out means being flanged to assist in the interlocking action.

For a better understanding of the invention reference should be had to the accompanying drawings wherein.

It will be understood that the coupling of the invention is normally used to connect circular or substantially circular sheet metal conduits used for the transmission of fluids, and particularly gases, such as hot and cold air conduits installed in homes and other buildings. Inasmuch as conduits of this type are well kown they have not been illustrated in conjunction with the invention, and the coupling alone will be described.

Figure 1:
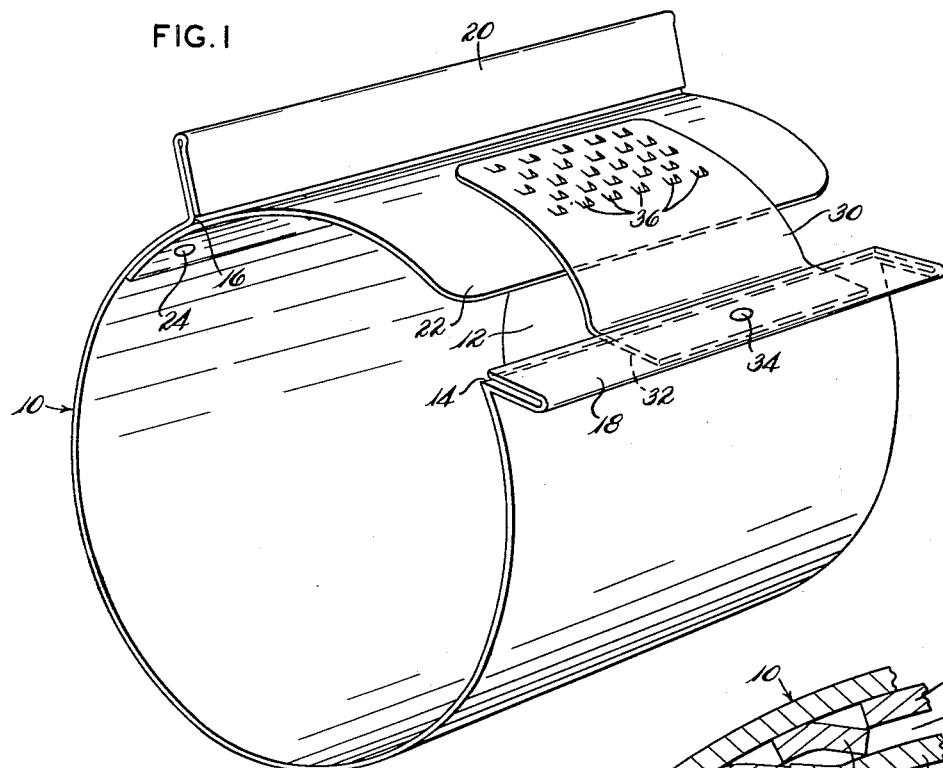
FIG. 1 is a perspective view of one best known embodiment of the invention.

In the drawings, the numeral 10 indicates generally a rectangular piece of sheet metal bent into circular form to provide the collar of FIG. 1 having a longitudinal split therein, indicated at 12, the split being defined by parallel opposed longitudinal edges indicated respectively by the numerals 14 and 16.

Means are normally provided upon the longitudinal edges 14 and 16 of the split collar for springing the collar shut around the conduits to be joined. These means normally take the form of integral flanges 18 and 20 formed upon the longitudinal edges, the flanges being of double thickness of sheet metal, as shown, and with the flanges 18 and 20 extending in substantially a radial direction.

Figure 2:
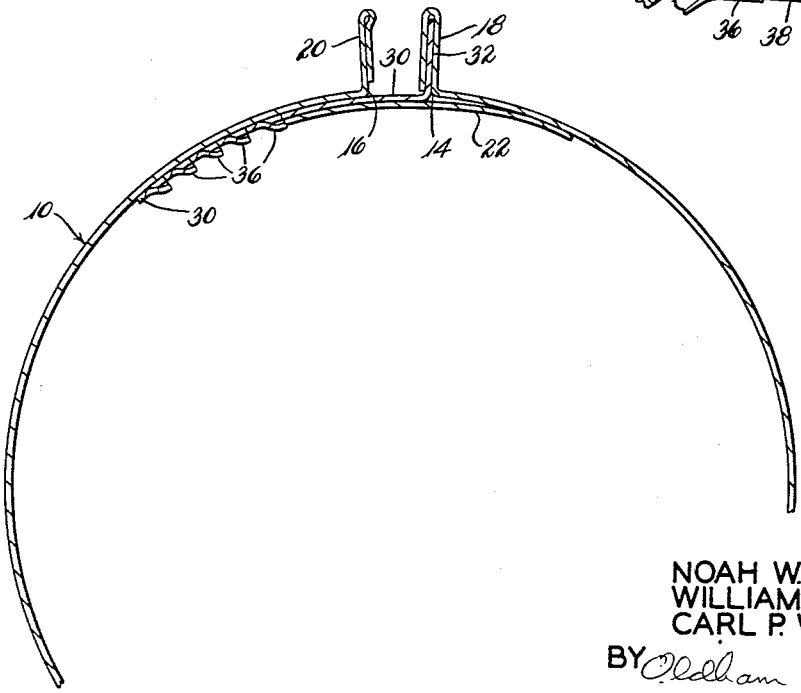
FIG. 2 is a somewhat enlarged diametric cross-sectional view of the coupling of FIG. 1.
Figure 4:
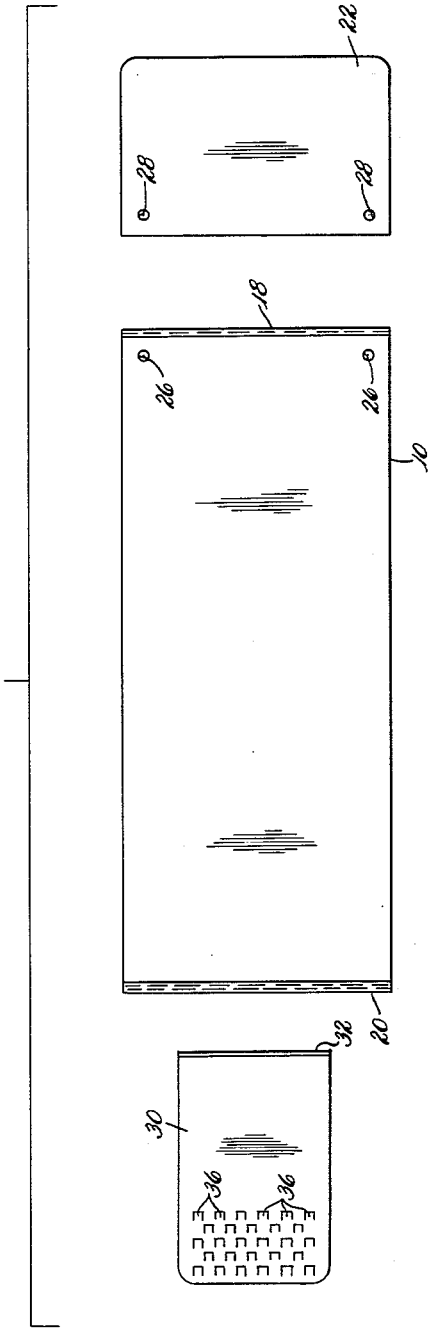
FIG. 4 is an exploded plan view of the parts of the coupling laid out flat and disconnected.
Figure 5:
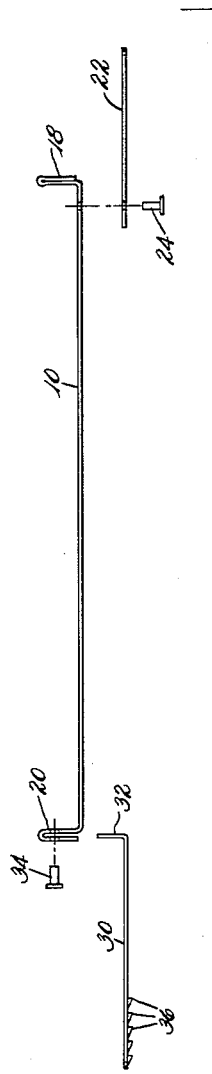
FIG. 5 is a side elevation of the parts of FIG. 4.

One longitudinal edge of the split 12, such as the longitudinal edge 16, is provided with a sheet metal shelf 22, curved as in FIG. 1, and made from the flat sheet metal part 22 shown in FIGS. 4 and 5. The corners of the shelf 22 are secured adjacent the edge 16 of the collar at only the corners of the shelf, for example by means of rivets 24 extending through holes 26 in the collar and holes 28 in the shelf, as best seen in FIG. 4. This leaves the center of the shelf 22 unsecured to the collar, all for purposes hereinafter described. The other end of the shelf 22 extends slidably beneath the longitudinal edge 14 of the collar, as shown in FIG. 2, when the coupling is secured around a conduit.

A tongue 30, curved substantially to the contour of the shelf 22, but of less longitudinal length than the shelf 22, is secured to the longitudinal edge 14 of the collar. FIGS. 4 and 5 show the flat sheet metal tongue 30 before it has been bent to curvature and secured to the longitudinal edge 14. One convenient manner of securing the tongue 30 to the longitudinal edge 14 is to form the tongue 30 with substantially a right angle flange 32, this flange extending up between the bent-over flange 18, in the manner seen in FIGS. 1 and 5, with the interengaging flanges being secured together, as by a rivet 34.

The tongue 30 is thus positioned in relation with the shelf 22 so that the tongue will stab between the unsecured central portion of the shelf 22 and the longitudinal edge 16 of the collar when the collar is squeezed around a conduit to be joined.

Formed on the tongue 30 are a plurality of rows of flange-like means adapted to have interlocking engagement with the edge of the shelf 22. These flange-like interlocking means may take the form of pressed out tongues 36 seen in plan view in FIG. 4 and in side elevation in FIG. 5 of the drawings. The pressed out tongues 36 define, as evident from the drawings, a plurality of rows of flanges, each row extending longitudinally of the collar, but with the rows being spaced circumferentially of the collar.

Now referring to FIG. 2, it will be seen that when the tongue 30 is stabbed between the shelf 22 and the collar that as the collar is squeezed down around the conduit to be coupled at least one of the rows of tongues 36 will interlock behind the edge of the shelf, and that the coupling is thereby very tightly secured to the conduit or conduits to be coupled. The fact that the corners of the shelf are fastened by the rivets 24 to the edge of the collar, with the shelf being sprung away from the collar by the thickness of the tongue 30 insures that the interlocking of the tongues 36 with the edge of the shelf is very positive to thereby seal the coupling tightly in position around the conduit or conduits to be coupled when the flanges 18 and 20 are gripped between the fingers and thumb, of one or both hands of an operator applying the coupling.

Figure 3:
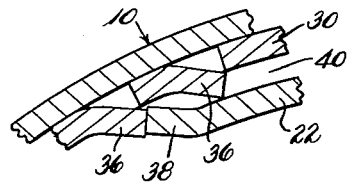
FIG. 3 is an enlarged fragmentary cross-sectional view of the interlocking flange means of the coupling.

FIG. 3 of the drawings illustrates in greater detail the interlocking action described in the preceding paragraph with one additional feature being shown. In FIG. 3 it will be seen that the tongue 30 has the fingers 36 pressed outwardly therefrom approximately the thickness of the sheet metal, and in the manner illustrated. The shelf 22 has its edge 38 formed with a radially outwardly directed flange likewise bent out from the surface of the shelf 22 a distance approximately equal to the thickness of the sheet metal. In this manner the very positive interlocking action illustrated in FIG. 3 is achieved between the pressed out fingers 36 of the tongue 30 and the flange 38 of the shelf 22. Additionally, a space 40 exists between the tongue 30 and the shelf 22 for the fingers 36 whereby any particular row of the fingers 36 can be engaged by the flange 38 at the edge of the shelf 22.

It is believed that the operation of the improved coupling of the invention will be understood from the foregoing description. Suffice it to say here that with the coupling in the form shown in FIG. 1, it can be sprung open and positioned around the conduit or conduits to be coupled. Thereafter the tongue 30 is stabbed in the slot provided between the shelf 22 and the edge of the split collar of the coupling, the unsecured center of the shelf 22 springing or yielding resiliently to allow this stabbing action, followed by the operator squeezing the flanges 18 and 20 of the coupling towards each other to tighten the coupling around the conduit or conduits. This action moves the fingers 36 beyond the edge or flange 38 of the edge of the shelf 22 to effect an interlocking of a row of the fingers with the edge of the shelf when the coupling is tightened down tightly around the conduit or conduits. The result is a very positive and maintenance-free coupling which can be applied in a matter of a few seconds time by a single operator.

While a certain representative embodiment and details have been shown for the purpose of illustrating the invention, it will be apparent to those skilled in this art that various changes and modifications may be made therein without departing from the spirit or scope of the invention.

What is claimed is:

1. A coupling for sheet metal conduits including a longitudinally-split, substantially cylindrical sheet metal collar normally springing open to a greater diameter than the conduits to be joined, first and second radially outwardly directed flanges on the collar, one adjacent each longitudinal edge of the split, said flanges being parallel and providing means to be gripped between the fingers and thumb of an operator to squeeze the collar to a smaller diameter, a shelf of substantially the same gauge, material, and length as the collar and arcuately curved to substantially the same radius as the collar, means securing one end of the shelf under said first flange on the collar and positioning the other end of the shelf to slide beneath said second flange and the collar, said shelf securing means being spaced apart a distance sufficient to provide a resiliently deformable slot between the shelf and the end of the collar adjacent said first flange to provide one member of a latch means, a tongue arcuately curved to substantially the same radius as the collar and of sufficiently less axial length than the distance apart of the shelf securing means to pass between the collar and shelf in the slot, means securing one edge of the tongue to the collar adjacent said second flange and directing the other edge of the tongue towards the slot, radially inwardly directed offset means providing a second member of a latch means and on said other edge of the tongue and locking behind the edge of the shelf when the tongue is stabbed through the slot, said means forming the second member of a latch means being so constructed and arranged that they engage in end to end engagement with the edge of the shelf which provides said one member of the latch means.

2. A coupling as defined in claim 1 wherein the offset means have camming surfaces facilitating the stabbing, and the edge of the shelf is turned slightly radially outward.

3. A coupling as defined in claim 1 wherein the offset means extend in a plurality of aligned rows across the tongue in a position parallel with the axis of the collar.

References Cited by the Examiner

UNITED STATES PATENTS

| 325,672 | 9/85 | Gray | 24—20 |
| 864,034 | 8/07 | Rudderow | 285—424 |
| 1,261,221 | 3/18 | Dutcher | 24—20X |
| 2,737,402 | 3/56 | De Frumerie et al. | 285—419 |
| 2,749,155 | 6/56 | Kinghorn | 285—424X |

THOMAS F. CALLAGHAN, *Primary Examiner.*

CARL W. TOMLIN, *Examiner.*